United States Patent [19]

Mathews et al.

[11] Patent Number: 5,152,644
[45] Date of Patent: Oct. 6, 1992

[54] GUIDE FOR PRECISION SHAPING TOOL

[76] Inventors: Milton W. Mathews, 2006 Worcester La., Garland, Tex. 75040; Jeffrey S. Mathews, 6909 Shorecrest, Rowlett, Tex. 75088

[21] Appl. No.: 782,339

[22] Filed: Oct. 24, 1991

[51] Int. Cl.⁵ .............................................. B23C 1/20
[52] U.S. Cl. .............................. 409/181; 408/241 S; 409/218
[58] Field of Search ............... 409/175, 177, 181, 182, 409/184, 204, 214, 218; 408/113, 97, 202, 241 S

[56] References Cited

U.S. PATENT DOCUMENTS

| | | |
|---|---|---|
| 1,565,790 | 12/1925 | Carter ................................ 409/182 |
| 2,238,304 | 4/1941 | Relanger ............................. 409/218 |
| 2,978,931 | 4/1961 | Broden ................................ 408/241 S |
| 3,131,599 | 5/1964 | MacFarlane et al. . |
| 3,274,889 | 9/1966 | Ferris . |
| 3,285,135 | 11/1966 | Shaw . |
| 3,779,663 | 12/1973 | Ruggles .............................. 408/113 |
| 4,113,404 | 9/1978 | Lippacher et al. ................. 408/202 |
| 4,156,990 | 6/1979 | Rutkowski . |
| 4,279,554 | 7/1981 | Seidenfaden . |
| 4,406,568 | 9/1983 | Rogers et al. . |

FOREIGN PATENT DOCUMENTS

| | | |
|---|---|---|
| 587025 | 11/1959 | Canada . |
| 3214182 | 10/1983 | Fed. Rep. of Germany ...... 408/202 |
| 188612 | 8/1987 | Japan ................................. 408/241 S |
| 103213 | 4/1989 | Japan ................................. 408/202 |

Primary Examiner—Daniel W. Howell
Attorney, Agent, or Firm—W. Kirk McCord

[57] ABSTRACT

A guide is provided for a shaping tool having a substantially cylindrical housing, a rotatable shaping member extending from one end of the housing and a drive motor for rotating the shaping member. The guide includes an elongated hollow member, a shaft telescoped within the hollow member such that a portion of the shaft projects outwardly from one end of the hollow member, and a tip adapted to at least partially surround the shaping member such that the shaping member protrudes a predetermined distance beyond a distal end of the tip member. A first mounting bracket is provided for mounting the hollow member with respect to the housing and for retaining the shaft in a predetermined fixed position with respect to the hollow member. A second mounting bracket is provided for mounting the tip member for co-movement with the shaft such that the predetermined distance which the shaping member protrudes beyond the distal end of the tip member is determined by the length of the shaft which projects outwardly from the hollow member. By adjusting the length of the shaping member protruding beyond the distal end of the tip member, the depth of penetration of the shaping member into a work piece, such as a piece of jewelry, is controlled to provide a uniform cutting depth.

14 Claims, 4 Drawing Sheets

GUIDE FOR PRECISION SHAPING TOOL

FIELD OF INVENTION

This invention relates generally to devices for limiting the depth of penetration of a cutting or shaping tool and in particular to a guide which is mountable on a precision shaping tool, such as a jewelry burring tool, to facilitate operation of the tool.

BACKGROUND OF THE INVENTION

Devices of various kinds are known in the art for adjusting the depth of penetration of a cutting or shaping tool. Examples of such devices are disclosed in Canadian patent 587,025 and U.S. Pat. Nos. 3,131,599; 3,274,889; 3,285,135; 4,156,990; 4,279,554; and 4,406,568. However, none of these prior art devices is suitable for use in connection with a precision shaping tool, such as a jewelry burring tool. A burring tool is used in the jewelry industry for various operations, including cutting channels for diamonds and other precious stones and setting grooves in prongs at a predetermined depth.

One of the problems associated with burring tool operations is the difficulty in achieving a uniform cutting depth. A high level of skill is required on the part of the operator and even then uniform cutting depth may not be achieved to the desired degree of precision.

There is therefore a need for an adjustable guide which is mountable on precision shaping tools, such as jewelry burring tools, for precisely adjusting the depth of penetration of the tool to a predetermined uniform depth.

DESCRIPTION OF THE INVENTION

In accordance with the present invention, a guide is provided for a shaping tool having a housing, a rotatable shaping member extending from one end of the housing and means located at least partially in the hollow member for rotating the shaping member. The guide is comprised of a hollow member, first mounting means for mounting the hollow member with the housing, a shaft telescoped within the hollow member such that a portion of the shaft projects outwardly from one end of the hollow member, a tip member adapted to at least partially surround the shaping member such that a predetermined length of the shaping member protrudes beyond a distal end of the tip member, and second mounting means for mounting the tip member for co-movement with the shaft. The length of the shaping member protruding beyond the distal end of the tip member is adjusted by adjusting the length of the portion of the shaft which projects outwardly from the hollow member.

The guide is adaptable for being mounted on handheld tool having a substantially cylindrical housing and an elongated shaping member protruding from the housing, such as a jewelry burring tool. The tip member of the guide is replaceable to accommodate shaping members of various sizes and configurations. In accordance with one feature of the invention, the hollow member has opposed beveled surfaces defining respective edges adapted to contact a curved outer surface of the cylindrical housing, whereby the hollow member is substantially aligned with the housing along a longitudinal axis of the housing.

In the preferred embodiment, the first mounting means includes a first mounting bracket having an opening for receiving the housing and hollow member. The first mounting bracket has opposed first and second holes and first and second attachment members adapted to penetrate through the respective first and second holes to secure the first mounting bracket to the housing and the hollow member to the first mounting bracket, respectively. The second mounting means preferably includes a second mounting bracket having a first opening for receiving the shaft, whereby a first part of the mounting bracket is mountable in concentric relation about the shaft, and a second opening for receiving the tip member, whereby a second part of the mounting bracket is mountable in concentric relation about the tip member. A first retaining member is provided for retaining the first part of the mounting bracket in fixed concentric relation about the shaft. A second retaining member is provided for retaining the second part of the mounting bracket in fixed concentric relation about the tip member such that the shaft and tip member are co-moveable relative to the shaping member, to adjust the length of the shaping member which projects beyond the distal end of the tip member. The distal end of the tip member prevents the shaping member from penetrating into a work piece beyond a desired depth. The guide facilitates operation of the shaping tool and enhances the precision thereof by providing a uniform depth of penetration of the shaping member into the work piece.

DETAILED DESCRIPTION OF THE PREFERRED EMBODIMENT

Figure 1:
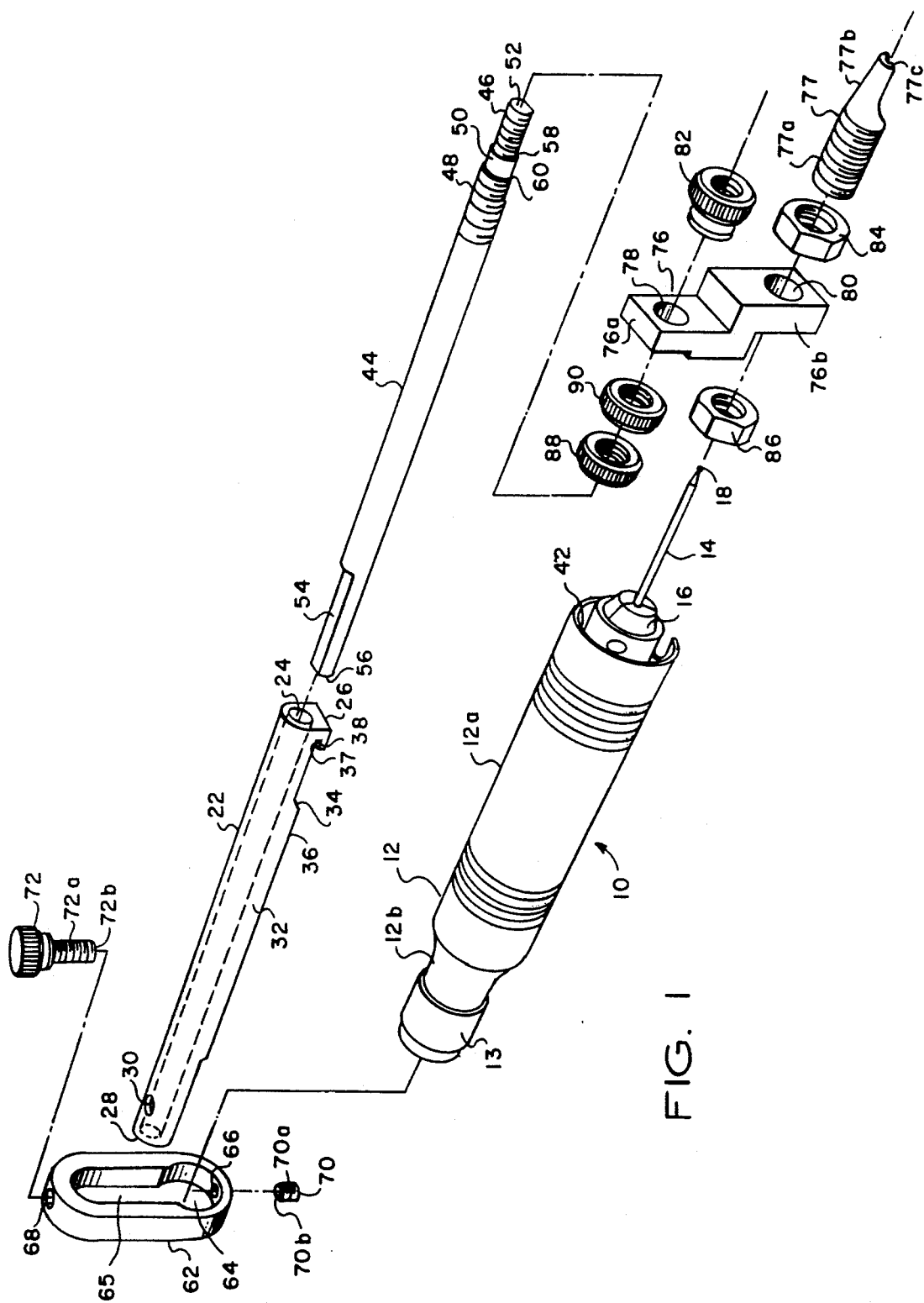
FIG. 1 is an exploded perspective view of a guide for a shaping tool, according to the present invention.

In the description which follows, like parts are marked throughout the specification and drawings with the same respective reference numerals. The drawings are not necessarily to scale and in some instances proportions may have been exaggerated in order to more clearly depict certain features of the invention.

Figure 2A:
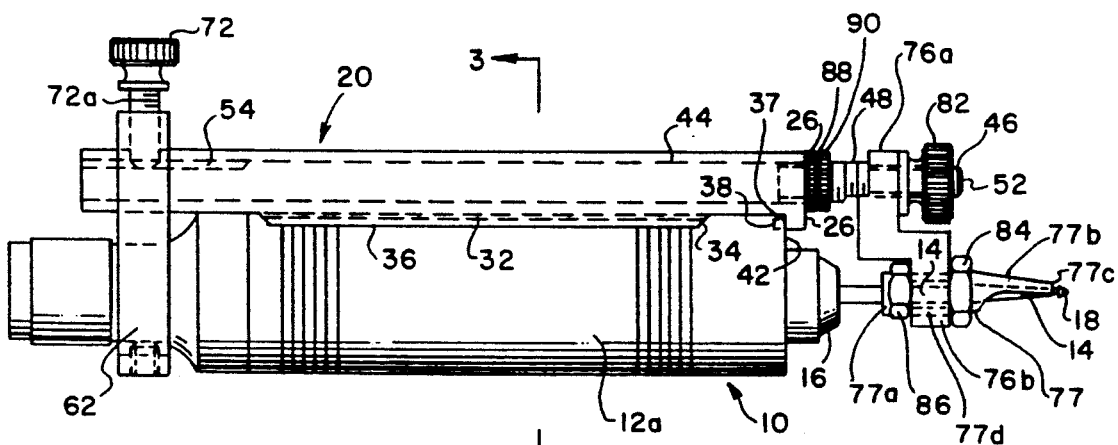
FIG. 2A is a side elevation view of the assembled guide, mounted on a shaping tool.
Figure 3:
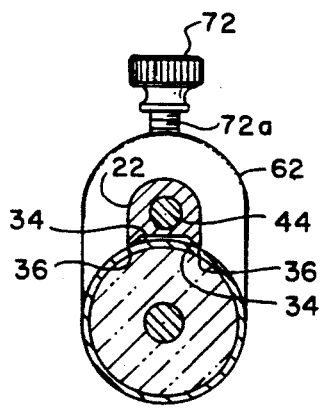
FIG. 3 is a sectional view, taken along the line 3—3 of FIG. 2A.

Referring now to FIG. 1, FIG. 2A and FIG. 3, a jewelry burring tool 10 typically includes a substantially cylindrical housing 12 and a shaft 14, which is coupled at one end thereof to a drive motor 16, located within housing 12, whereby shaft 14 is rotatable. The longitudinal axis of shaft 14 is preferably aligned with the longitudinal axis of housing 12. A burr 18 is located at an opposite end of shaft 14. Housing 12 includes a main body portion 12a and a tapered neck portion 12b. A collar 13 is located on neck portion 12b.

In accordance with the present invention a guide 20 is provided for being mounted on tool 10, as can be best, seen in FIG. 2A. Guide 20 includes an elongated hollow member 22 having a substantially cylindrical internal passageway 24 extending between respective front and back ends 26 and 28 of hollow member 22. Hollow member 22 has a substantially semi-elliptical shape in lateral cross-section, as can be best seen in FIG. 3. An aperture 30, communicating with passageway 24, is located adjacent back end 28. In lateral cross-section, hollow member 22 has a substantially semi-elliptical shape, punctuated by flanges 32 on respective opposed sides of hollow member 22. Flanges 32 have respective beveled surfaces 34 and respective distal edges 36. Edges 36 are adapted to contact the curved outer surface of body portion 12a, as can best seen in FIG. 3, to help align hollow member 22 along the respective longitudinal axes of housing 12 and shaft 14. Each beveled surface 34 is beveled at an angle of approximately 45°.

Front end 26 of hollow member 22 has a generally vertical surface 37 in facing relation with back end 28. A shelf 38 depends downwardly and away from surface 37, to define a wedge with an inclined top surface. The top surface of shelf 38 is adapted to engage front end portion 42 to locate guide 20 with respect to housing 12, as can be best seen in FIG. 2A. Shelf 38 cooperates with edges 36 to align hollow member 22 along the respective longitudinal axes of housing 12 and shaft 14. The inclined top surface accommodates variations in the radius of curvature and thickness of body portion 12a.

An elongated shaft 44 is telescoped within hollow member 22 such that a portion of shaft 44 projects outwardly from front end 26. Shaft 44 has first and second threaded portions 46 and 48, respectively, with a non-threaded portion 50 intermediate threaded portions 46 and 48. First threaded portion 46 is located adjacent front end 52 of shaft 44. Shaft 46 further includes a relatively flat portion 54, adjacent back end 56 of shaft 44. Non-threaded portion 50 is enlarged with respect to first threaded portion 46 to define a first shoulder 58 therebetween. Second threaded portion 48 is enlarged with respect to non-threaded portion 50 to define a second shoulder 60 therebetween.

Guide 20 is assembled as follows. Shaft 44 is inserted into passageway 24 such that a portion of shaft 44 which includes at least first threaded portion 46 and non-threaded portion 50 projects outwardly from front end 26 of hollow member 22. A first mounting bracket 62 is provided for mounting hollow member 22 with housing 12. First mounting bracket 62 has a keyhole-shaped central opening, which includes a substantially circular opening 64 for receiving neck portion 12b and a substantially elliptical opening 65 for receiving hollow member 22. First mounting bracket 62 has first and second opposed holes 66 and 68, respectively. Respective first and second securing members 70 and 72, are provided for penetrating through respective first and second holes 66 and 68 to secure first mounting bracket 62 to neck portion 12b and to secure hollow member 22 to first mounting bracket 62, respectively, as can best seen in FIG. 2A. First and second securing members 70 and 72 have respective threaded portions 70a and 72a, which are adapted to engage complementary threads within respective first and second holes 66 and 68. End portion 70b of first securing member 70 engages neck portion 12b to mount first mounting bracket 62 in fixed concentric relation about neck portion 12b. Hollow member 22, with shaft 44 telescopically received therein, is mounted in a fixed position with respect to housing 12.

Back end 28 is inserted through opening 65 such that second hole 68 is substantially in vertical alignment with aperture 30. Second securing member 72 is inserted into second hole 68 and is rotated such that threaded portion 72a penetrates through second hole 68 and through aperture 30 until end portion 72b of second securing member 72 engages relatively flat portion 54 of shaft 44 in pressure engagement, to mount hollow member 22 in a fixed position with respect to first mounting bracket 62 and to retain shaft 44 in a fixed position with respect to hollow member 22.

A second mounting bracket 76 is provided for mounting a tip member 77 for co-movement with shaft 44. Second mounting bracket 76 includes a top portion 76a having a central opening 78 and a bottom portion 76b having a central opening 80. Opening 78 is adapted to receive shaft 44, whereby top portion 76a is located in concentric relation about non-threaded portion 50. A threaded retaining nut 82 is adapted for engagement with first threaded portion 46 and cooperates with second shoulder 60 to retain top portion 76a in concentric relation about non-threaded portion 50.

Figure 4:
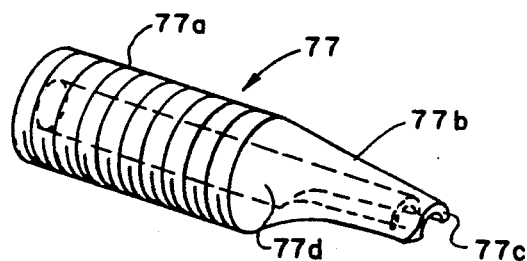
FIG. 4 is a perspective view of one embodiment of a tip member of the guide.

Referring also to FIG. 4, tip member 77 has a substantially cylindrical body portion 77a and a tapered neck portion 77b. Body portion 77a has an external threaded surface. Neck portion 77b has a substantially semi-circular lateral crosssection. Opening 80 is adapted to receive body portion 77a for locating bottom portion 76b in concentric relation about body portion 77a. Threaded retaining nuts 84 and 86 are provided for securing bottom portion 76b in fixed concentric relation about body portion 77a. As can best seen in FIG. 2A, retaining nuts 84 and 86 are located on respective opposite sides of bottom portion 76b and are tightened against the respective opposite sides of bottom portion 76b to retain bottom portion 76b in fixed concentric relation about body portion 77a.

Tip member 77 has an internal bore 77d adapted to receive shaft 14, as can be best seen in FIG. 2A. Burr 18 and a portion of shaft 14 on which burr 18 is carried protrude beyond a distal end 77c of tip member 77. One skilled in the art will recognize that the depth of penetration of burr 18 into a work piece depends on the distance which burr 18 protrudes beyond distal end 77c. This distance is adjusted by adjusting the position of shaft 44 with respect to hollow member 22. The position of shaft 44 is adjusted by loosening second securing member 72 such that end portion 72b is disengaged from relatively flat portion 54, whereby shaft 44 is moveable with respect to hollow member 22. When tip member 77 is in a desired position such that burr 18 protrudes the desired distance beyond distal end 77c, second securing member 72 is re-tightened against relatively flat portion 54, to secure shaft 44 in the desired fixed position with respect to hollow member 22 and to maintain tip member 77 in fixed concentric relationship about shaft 14. Flat portion 54 prevents shaft 44 from rotating about its own axis, thereby preventing second mounting bracket 76 and tip member 77 from rotating about shaft 14. The length of relatively flat portion 54 along shaft 44 determines the approximate range of positions of shaft 44 with respect to hollow member 22. One skilled in the art will recognize that the distance which burr 18 protrudes beyond distal end 77c is determined by the length of shaft 44 which projects outwardly from front end 26 of hollow member 22. As can be best seen in FIG. 2A, body portion 77a substantially completely surrounds shaft 14, while neck portion 77b only partially surrounds shaft 14.

In accordance with another feature of the invention, two threaded nuts 88 and 90 are located in concentric relation about second threaded portion 48 of shaft 44. Threaded nut 90 engages threaded nut 88 to retain threaded nut 88 in a predetermined fixed position on second threaded portion 48. As such, threaded 90 functions as "jam" nut. Threaded nut 88 engages front end 26 of hollow member 22, to limit the depth of insertion of shaft 44 into hollow member 22, as can best seen in FIG. 2A. The location of nut 88 on second threaded portion 48 serves as a reference position for locating shaft 44 in a desired position relative to hollow member 22. When nut 88 is retained in a predetermined fixed position by nut 90, shaft 44 can be expeditiously returned to the desired position by positioning nut 88 in facing contact with front end 26. The desired position of shaft 44 can of course be adjusted by adjusting the position of nuts 88 and 90 on second threaded portion 48. The assembled guide 20 is retained in a nonrotatable position with respect to housing 12, as can be best seen in FIG. 2A.

Figure 2B:
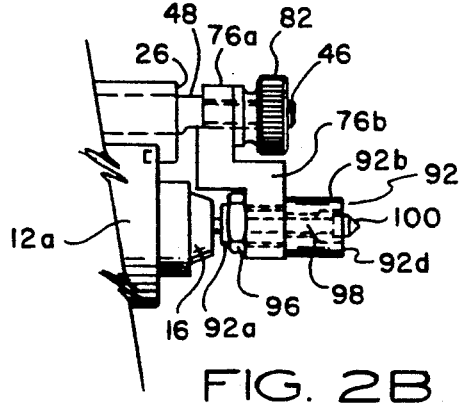
FIG. 2B is a side elevation view of a front portion of the guide.
Figure 5:
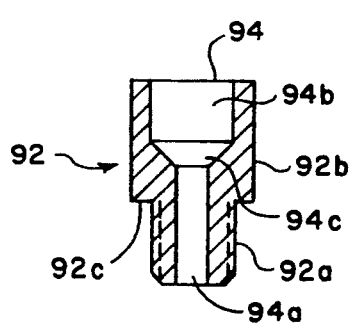
FIG. 5 is a longitudinal sectional view of an alternate embodiment of a tip member of the guide.
Figure 6:
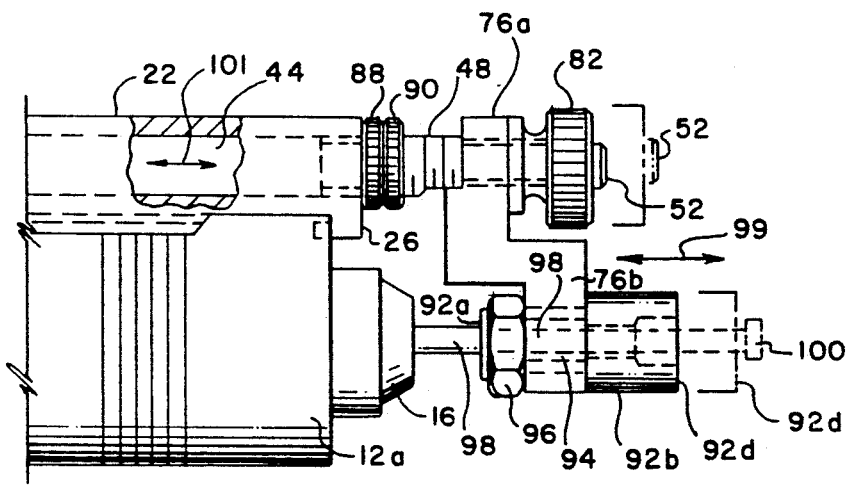
FIG. 6 is a partial side elevation view of the guide, depicting the adjustability feature of the guide.

Referring now to FIG. 2B, FIG. 5 and FIG. 6, guide 20 is equipped with a tip member 92, which includes a first cylindrical portion 92a and a second cylindrical portion 92b, enlarged with respect to first cylindrical portion 92a, to define a shoulder 92c therebetween. Tip member 92 further includes an interior passageway 94. Passageway 94 includes a first cylindrical bore 94a and a second cylindrical bore 94b, enlarged with respect to first cylindrical bore 94a. A conical bore 94c is intermediate first and second cylindrical bores 94a and 94b. First cylindrical portion 92a is adapted to be received within opening 80 (see FIG. 1) of second mounting bracket 76 such that bottom portion 76b of second mounting bracket 76 is in concentric relation about first cylindrical portion 92a. First cylindrical portion 92a has an external threaded surface and is engageable by a threaded nut 96. When shoulder portion 92c is in contact with one side of bottom part 76b and nut 96 is tightened against an opposite side of bottom portion 76b, bottom portion 76b is retained in fixed concentric relation about first cylindrical portion 92a. A rotatable shaft 98 is coupled at one end thereof to drive motor 16 located within housing 12, whereby shaft 98 is rotatable. A burr 100 is located at an opposite end of shaft 98. Shaft 98 extends through passageway 94 and is rotatable within passageway 94. Tip member 92 is located with respect to shaft 98 such that a burr 100 carried on shaft 98 extends a predetermined distance beyond distal end 92d of tip member 92. The predetermined distance is adjustable by adjusting the position of tip member 92 in a desired direction along shaft 98, as indicated by arrows 99. The adjustment is effected by adjusting the position of shaft 44 along hollow member 22 in a desired direction, as indicated by arrows 101, as shown in FIG. 6. Tip member 92 is co-movable with shaft 44.

Figure 7A:
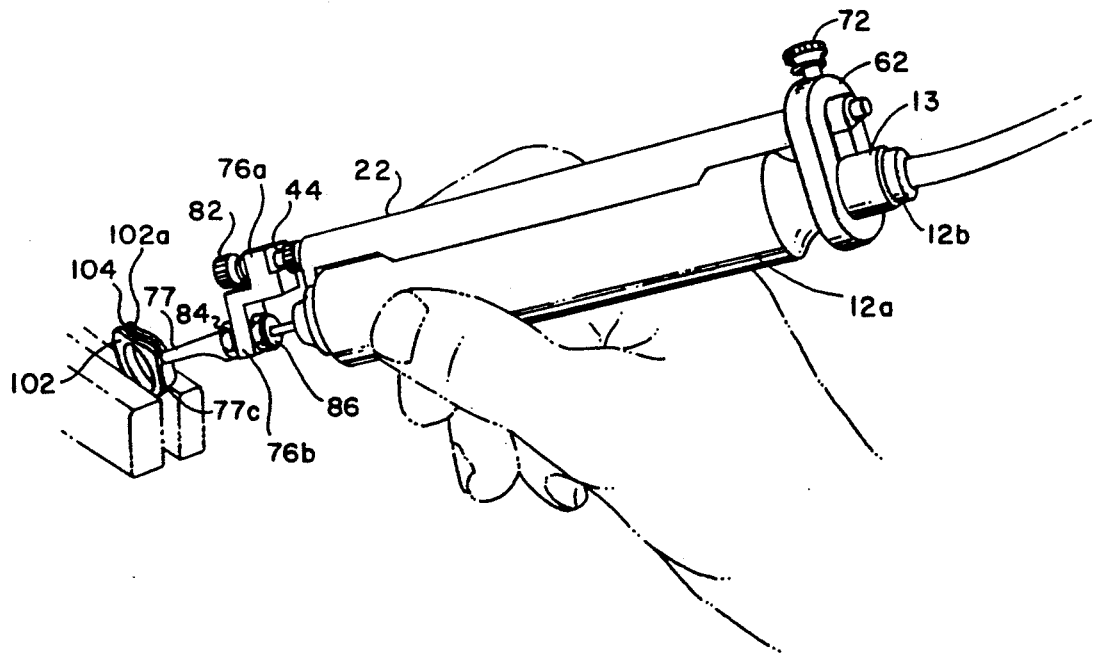
FIGS. 7A, 7B, 8A and 8B are various views, depicting various operations of the guide and tool.
Figure 7B:
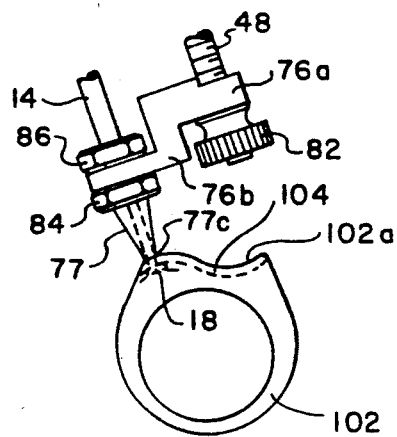

Referring to FIG. 7A, 7B, 8A and 8B, the operation of tool 10, with guide 20 mounted thereon, is depicted. Tool 10 is hand-operated, as shown. In FIG. 7A, tip member 77 is located such that burr 18 extends a predetermined distance beyond distal end 77c (see FIG. 2A) corresponding to a desired uniform depth of penetration into a work piece, such as a ring 102. Tool 10 is operated such that burr 18 penetrates through top surface 102a of ring 102 until distal end 77c engages top surface 102a. Top surface 102a is depicted as having an undulating shape. After burr 18 penetrates to a desired depth of penetration, the cutting operation continues until a channel 104, which follows the undulating contour of top surface 102a, is cut through ring 102. By maintaining distal end 77c in contact with top surface 102a, a channel 104 of substantially uniform depth is cut in ring 102. After channel 104 is cut, diamonds or other precious stones can be inserted in channel 104 in the conventional manner. The shape of burr 18 determines the shape of channel 104.

Figure 8A:
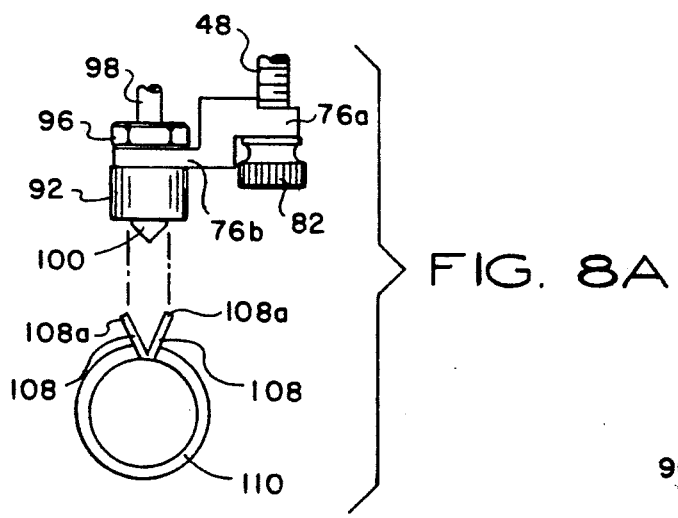
Figure 8B:
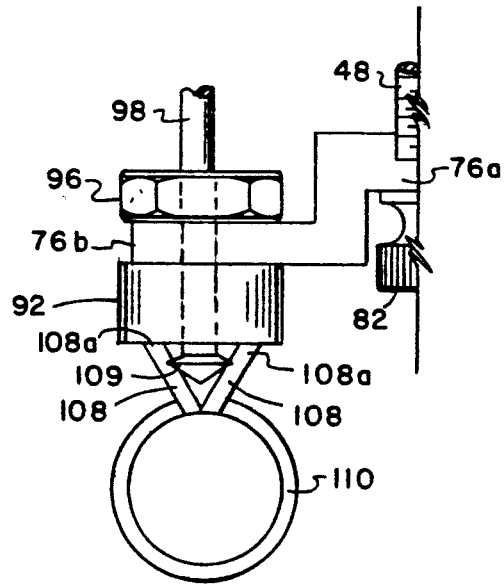

Another operation of tool 10, with guide 20 mounted thereon, is depicted in FIG. 8A. Guide 20 is equipped with tip member 92, which is positioned with respect to shaft 98, such that burr 100 extends a predetermined distance beyond distal end 92d. Burr 100 is used for shaping prongs 108, which extend from a ring 110. The shaping operation includes removing excess solder and the like from between prongs 108. In FIG. 8B, a burr 109 is used to cut a groove 111 in each of the prongs 108 for receiving a diamond or other precious stone. After the diamond is located in a desired position between prongs 108, respective top portions 108a of prongs 108 are bent over the top of the diamond to retain the diamond within prongs 108.

One skilled in the art will recognize that the guide according to the present invention is adaptable for a variety of precision shaping operations, including, but not limited to, the shaping operations depicted in FIGS. 7A, 7B, 8A and 8B, as well as other precision operations, such as string polishing of metal objects. The guide provides a uniform depth of penetration of the shaping element, to facilitate shaping operations and enhance the precision thereof. The guide is particularly well-suited for use in conjunction with jewelry burring tools and a variety of burrs.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. A guide for a shaping tool, the tool including a substantially cylindrical housing with a curved outer surface, a rotatable shaping member extending form one end of the housing and means located at least partially in the housing for rotating the shaping member, said guide comprising:

a hollow member having opposed beveled surfaces defining respective opposed edges adapted to contact the curved outer surface of the housing, whereby said hollow member is substantially aligned with the housing along a longitudinal axis of the housing;

first mounting means for mounting said hollow member with the housing;

a shaft telescoped within said hollow member such that a portion of said shaft projects outwardly from one end of said hollow member;

a tip member adapted to at least partially surround the shaping member such that a predetermined length of the shaping member protrudes beyond a distal end of said tip member; and second mounting means for mounting said tip member for co-movement with said shaft, whereby the length of the shaping member protruding beyond said distal end of said tip member is defined by the length of the portion of said shaft which projects outwardly from said one end of said hollow member, the length of the shaping member protruding beyond said distal end of said tip member being adjustable by adjusting the length of said shaft which projects outwardly from said one end of said hollow member.

2. The guide of claim 1, wherein said hollow member has opposed flanges defining the respective opposed beveled surfaces.

3. The guide of claim 1 wherein said one end of said hollow member has a surface in facing relation with an opposite end of said hollow member and a shelf projecting from said surface toward said opposite end, said shelf having an inclined top surface and being adapted to engage a front portion of said housing for locating the hollow member with respect to said housing, said shelf being adapted to cooperate with said opposed edges for aligning said hollow member along said longitudinal axis.

4. A guide for a shaping tool, the tool having a housing, a rotatable shaping member extending from one end of the housing and means located at least partially in the housing for rotating the shaping member, said guide comprising:

a hollow member;

first mounting means for mounting said hollow member with the housing, said first mounting means including a mounting bracket having an opening for receiving the housing and said hollow member, said mounting bracket having opposed first and second holes, said first mounting means further including first and second securing members adapted to penetrate through the respective first and second holes to secure said mounting bracket to the housing and said hollow member to said mounting bracket, respectively;

a shaft telescoped within said hollow member such that a portion of said shaft projects outwardly from one end of said hollow member;

a tip member adapted to at least partially surround the shaping member such that a predetermined length of the shaping member protrudes beyond a distal end of said tip member; and second mounting means for mounting said tip member for co-movement with said shaft, whereby the length of the shaping member protruding beyond said distal end of said tip member is defined by the length of the portion of said shaft which projects outwardly from said one end of said hollow member, the length of the shaping member protruding beyond said distal end of said tip member being adjustable by adjusting the length of said shaft which projects outwardly from said one end of said hollow member.

5. The guide of claim 4 wherein said hollow member has an aperture adjacent an opposite end of said hollow member said one end of said hollow member and communicating with an interior portion of said hollow member, said aperture being adapted for alignment with said second hole to accommodate said second securing member, said shaft having a relatively flat portion, said second securing member being adapted to penetrate through said second hole and said aperture and engage said relatively flat portion in pressure engagement, whereby said hollow member is secured against movement with respect to said mounting bracket and said shaft is secured against movement with respect to said hollow member.

6. The guide of claim 5 wherein the housing has a substantially cylindrical neck portion adjacent an opposite end of the housing from said one end of the housing and a substantially cylindrical body portion which is enlarged with respect to the neck portion of the housing, said mounting bracket being positionable in concentric relation about the neck portion of the housing, said mounting bracket being adapted for concentric relation about the neck portion of the housing.

7. A guide for a shaping tool, the tool having a housing, a rotatable shaping member extending from one end of the housing and means located at least partially in the housing for rotating the shaping member, said guide comprising:

a hollow member;

first mounting means for mounting said hollow member with said housing;

a shaft telescoped within said hollow member such that a portion of said shaft projects outwardly from one end of said hollow member, said shaft having first and second threaded shaft portions and a non-threaded shaft portion intermediate said first and second threaded shaft portions, said first threaded shaft portion being adjacent an end of said shaft which projects outwardly from said one end of said hollow member, said non-threaded shaft portion being enlarged relative to said first threaded shaft portion to define a first shoulder therebetween, said second threaded shaft portion being enlarged relative to said non-threaded shaft portion to define a second shoulder therebetween;

a tip member adapted to at least partially surround the shaping member such that a predetermined length of the shaping member protrudes beyond a distal end of said tip member; and second mounting means for mounting said tip member for co-movement with said shaft, whereby the length of the shaping member protruding beyond said distal end of said tip member is defined by the length of the portion of said shaft which projects outwardly from said one end of said hollow member, the length of the shaping member protruding beyond said distal end of said tip member being adjustable by adjusting the length of said shaft which projects outwardly from said one end of said hollow member, said second mounting means including a mounting bracket having a first opening for receiving said shaft, whereby a first part of said mounting bracket is positionable in concentric relation about said shaft, said mounting bracket further including a second opening for receiving said tip member, whereby a second part of said mounting bracket is positionable in concentric relation about said tip member, said second mounting means further including a first retaining member adapted for threaded engagement with said first threaded shaft portion, said first retaining member cooperating with said second shoulder to retain said first part of said mounting bracket in fixed concentric relation about said non-threaded shaft portion, said tip member having an external threaded surface, said second mounting means further including a second retaining member adapted for threaded engagement with said external threaded surface of said tip member for retaining said second part of said mounting bracket in fixed concentric relation about said tip member.

8. The guide of claim 7 further including locating means in concentric relation about the second threaded shaft portion for locating said shaft relative to said hollow member to define the length of said shaft which projects outwardly from said one end of said hollow member.

9. The guide of claim 8 wherein said locating means includes first and second threaded nuts in concentric relation about said second threaded shaft portion and in threaded engagement therewith, said first nut being movable along said second threaded shaft portion, said second nut being adapted to engage said first nut to retain said first nut at a predetermined position on said second threaded shaft portion, said first nut defining the length of said shaft which projects outwardly from said one end of said hollow member and the length of the shaping member which protrudes beyond said distal end of said tip member when said first nut is in contact with said one end of said hollow member.

10. A guide for a shaping tool, the tool having a housing, a rotatable shaping member extending from one end of the housing and means located at least partially in the housing for rotating the shaping member, said guide comprising:
a hollow member;
first mounting means for mounting said hollow member with the housing;
a shaft telescoped within said hollow member such that a portion of said shaft projects outwardly from one end of said hollow member;
a tip member adapted to at least partially surround the shaping member such that a predetermined length of the shaping member protrudes beyond a distal end of said tip member, said tip member having a substantially cylindrical body portion and a tapered neck portion, said tapered neck portion having a substantially semi-circular lateral cross-section, said tip member being positionable with respect to the shaping member such that said body portion of said tip member substantially completely surrounds a first part of the shaping member and said neck portion of said tip member partially surrounds a second part of the shaping member, said distal end of said tip member being defined by a distal end of said neck portion of said tip member; and
second mounting means for mounting said tip member for co-movement with said shaft, whereby the length of the shaping member protruding beyond said distal end of said tip member is defined by the length of the portion of said shaft which projects outwardly from said one end of said hollow member, the length of the shaping member protruding beyond said distal end of said tip member being adjustable by adjusting the length of said shaft which projects outwardly from said one end of said hollow member.

11. The guide of claim 10 wherein said second mounting means includes a mounting bracket having a first opening for receiving said shaft, whereby a first part of said mounting bracket is positionable in concentric relation about said shaft, and a second opening for receiving said tip member, whereby a second part of said mounting bracket is positionable in concentric relation about said tip member, said second mounting means including a first retaining member adapted to retain said first part of said mounting bracket in fixed concentric relation about said shaft, said body portion having an external threaded surface, said second mounting means further including a second retaining member having an internal threaded surface adapted to engage said external threaded surface for retaining said second part of said mounting bracket in fixed concentric relation about said body portion, said second retaining member including first and second threaded nuts in concentric relation about said external threaded surface, said first and second threaded nuts cooperating to engage respective opposed sides of said second part of said mounting bracket for retaining said tip member in a fixed position relative to said mounting bracket.

12. A guide for a shaping tool, the tool having a housing, a rotatable shaping member extending from one end of the housing and means located at least partially in the housing for rotating the shaping member, said guide comprising:
a hollow member;
first mounting means for mounting said hollow member with the housing;
a shaft telescoped within said hollow member such that a portion of said shaft projects outwardly from one end of said hollow member;
a tip member adapted to at least partially surround the shaping member such that a predetermined length of the shaping member protrudes beyond a distal end of said tip member, said tip member having a first substantially cylindrical portion and a second substantially cylindrical portion enlarged with respect to said first substantially cylindrical portion to define a shoulder therebetween, said tip member being positionable with respect to the shaping member such that said first substantially cylindrical portion substantially completely surrounds a first part of the shaping member and said second substantially cylindrical portion substantially completely surrounds a second part of the shaping member, said distal end of said tip member being defined by a distal end of said second substantially cylindrical portion; and
second mounting means for mounting said tip member for co-movement with said shaft, whereby the length of the shaping member protruding beyond said distal end of said tip member is defined by the length of the portion of said shaft which projects outwardly from said one end of said hollow member, the length of the shaping member protruding beyond said distal end of said tip member being adjustable by adjusting the length of said shaft which projects outwardly from said one end of said hollow member.

13. The guide of claim 12 wherein said second mounting means includes a mounting bracket having a first opening for receiving said shaft, whereby a first part of said mounting bracket is positionable in concentric relation about said shaft, and a second opening for receiving said tip member, whereby a second part of said mounting bracket is positionable in concentric relation about said tip member, said second mounting means further including a first retaining member adapted to retain said first part of said mounting bracket in fixed concentric relation about said shaft, said first substantially cylindrical portion having an external threaded surface, said second mounting means further including a second retaining member having an internal threaded surface adapted to engage said external threaded surface for retaining said second part of said mounting bracket in fixed concentric relation about said first substantially cylindrical portion, said second retaining member including a threaded nut in concentric relation about said external threaded surface, said nut and said shoulder cooperating to engage respective opposed sides of said second part of said mounting bracket for retaining said tip member in a fixed position relative to said mounting bracket.

14. A guide for a shaping tool, said tool having a substantially cylindrical housing, a rotatable shaping member extending from a front end of the housing and means located at least partially in said housing for rotating said shaping member, said guide comprising:

an elongated hollow member having opposed side flanges with beveled surfaces, said beveled surfaces defining respective opposed edges adapted to contact a curved outer surface of said housing, a front end of said hollow member having a surface in facing relation with a back end of said hollow member and a shelf projecting from said surface toward said back end, said shelf being adapted to engage a front portion of said housing for locating said hollow member with respect to said housing, said shelf being adapted to cooperate with said opposed edge for aligning said hollow member along a longitudinal axis of said housing, said hollow member having an aperture adjacent said back end and communicating with an interior portion of said hollow member;

a first mounting bracket having an opening for receiving said housing and said hollow member, said first mounting bracket having opposed first and second holes;

a first securing member adapted to penetrate through the first hole to secure the first mounting bracket to the housing and a second securing member adapted to penetrate through said second hole and said aperture to secure the hollow member to the first mounting bracket;

a shaft telescoped within said hollow member such that a portion of said shaft projects outwardly from a front end of said hollow member, said shaft having a relatively flat portion, said second securing member being adapted to penetrate through said second hole and said aperture and engage said relatively flat portion, whereby said shaft is secured against movement with respect to said hollow member;

a tip member adapted to at least partially surround said shaping member such that a predetermined length of said shaping member protrudes beyond a distal end of said tip member;

a second mounting bracket having a first portion adapted for concentric relation about said shaft and a second portion adapted for concentric relation about said tip member;

first and second retaining members for retaining the respective first and second portions of said second mounting bracket in respective fixed positions about said shaft such that said shaft and tip member are co-movable relative to said shaping member, the length of said shaping member protruding beyond the distal end of said tip member being defined by the length of the portion of the shaft which projects outwardly from said front end of said hollow member, the length of the shaping member which protrudes beyond the distal end of said tip member being adjustable by adjusting the length of the portion of the shaft which projects outwardly from said front end of said hollow member.

* * * * *